United States Patent Office.

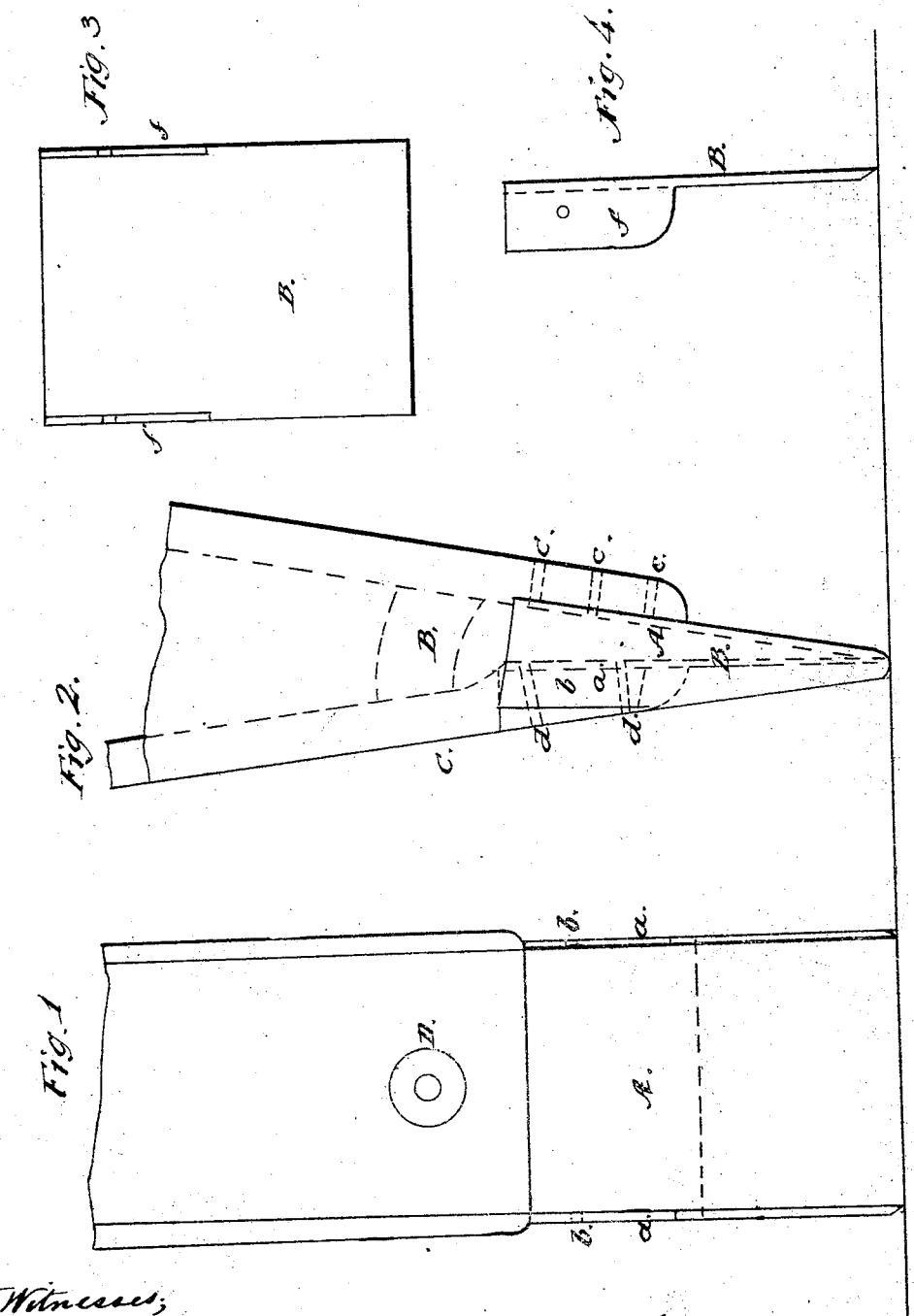

ORSON BILLINGS, OF LAGRANGE, OHIO, ASSIGNOR TO HIMSELF, RUSSELL H. PENFIELD, AND HOMER PENFIELD.

*Letters Patent No. 71,572, dated December 3, 1867; antedated November 29, 1867.*

CORN-PLANTER.

The Schedule referred to in these Letters Patent and making part of the same.

TO ALL WHOM IT MAY CONCERN:

Be it known that I, ORSON BILLINGS, of Lagrange, in the county of Lorain, and State of Ohio, have invented certain new and useful Improvements in Corn-Planters; and I do hereby declare that the following is a full, clear, and exact description of the same, reference being had to the accompanying drawings, and the letters of reference marked thereon. In the drawings—

Figure 1 is a detached side elevation.
Figure 2 is a detached front elevation.
Figures 3 and 4 are detached views.

The nature of my invention consists in constructing the inserters of hand corn-planters of sheet steel, and so forming them that they will not become clogged or obstructed by dirt when the ground is wet and sticky.

To enable others skilled in the arts to make and use my invention, I will proceed to describe its construction and operation.

A represents a blade of the inserter, which is formed as seen in figs. 1 and 2, having flanges formed on the sides of the plate, as seen at $a$. Said flanges stand at right angles to the plate, and their lower ends are cut diagonally, so as to make them narrower at the lower end than at the top. The lower end of the flange is, however, just as wide as the space formed where the jaws of the apparatus are opened to their full extent. The object of these flanges is to prevent dirt from passing in between the inserters during the operation of planting, which, as will readily be seen, it does most effectually. The flanges $a$ are perforated, as seen at $b$, for the purpose of admitting a bolt or pin, thus forming a pivot on which the jaws work. The inserter A is screwed to the case of the apparatus by means of rivets, screws, or otherwise, as seen at $c$, fig. 2. B represents another blade of the inserter, which is screwed to the lower end of the lever C by means of rivets or screws, as seen at $d$, fig. 2. Said blade is also provided with flanges $ff$, which lap over the edges of the lever, and through which perforations are formed for the purpose of admitting the bolt which forms the pivot. The lower end of the inserter is flat, but may be curved or straight, as desired, having its lower edges chamfered, so as to sharpen them, and thus their insertion into the ground greatly facilitated. The jaws are hinged together, as seen in fig. 2. D represents a gum-elastic spring, which is constructed in a cylindrical form, having its ends cut diagonally, so as to conform to the angle formed by the inside of the back part of the case.

By compressing the handles the inserters are forced apart, thus allowing the free passage of the corn or seed.

What I claim as new, and desire to secure by Letters Patent, is—

The blade A, with its flanges $a$, in combination with blade B, having flanges $f$ and spring D, substantially as described and set forth.

ORSON BILLINGS. [L. S.]

Witnesses:
    E. D. SIMONDS,
    H. F. WILLSON.